United States Patent [19]

Coutant

[11] Patent Number: 4,676,349
[45] Date of Patent: Jun. 30, 1987

[54] FLUID PRESSURE CONTROL SYSTEM HAVING A PRESSURE CUTBACK DEVICE

[75] Inventor: Alan R. Coutant, Chillicothe, Ill.

[73] Assignee: Caterpillar Inc., Peoria, Ill.

[21] Appl. No.: 836,930

[22] Filed: Mar. 6, 1986

[51] Int. Cl.$^4$ .................. F16D 25/11; F16D 25/00
[52] U.S. Cl. .................. 192/3.57; 192/52;
    192/87.1; 192/87.13; 192/87.19; 192/85 R;
    74/335; 91/451; 91/518
[58] Field of Search ............ 192/3.57, 52, 87.1,
    192/87.11, 87.13, 87.18, 87.19, 109 F, 85 R;
    91/433, 451, 452, 518; 74/867, 868, 335

[56] References Cited

U.S. PATENT DOCUMENTS

| | | | |
|---|---|---|---|
| 3,042,165 | 7/1962 | Yokel | 192/85 |
| 3,181,394 | 5/1965 | Ramsel et al. | 74/754 |
| 3,386,540 | 6/1968 | Horsch et al. | 192/9 |
| 3,389,770 | 6/1968 | Golan et al. | 192/87.13 |
| 3,570,522 | 3/1971 | Horsch et al. | 137/117 |
| 3,582,929 | 6/1971 | Dollase | 192/87.1 X |
| 3,674,121 | 7/1972 | Copeland | 192/52 |
| 3,731,558 | 5/1973 | Enomoto | 74/867 |
| 3,897,698 | 8/1975 | Ohsaka | 192/3.57 X |
| 3,991,865 | 11/1976 | Komatsu | 192/109 F |
| 4,086,994 | 5/1978 | Hirosawa et al. | 192/87.19 |
| 4,583,624 | 4/1986 | Blake | 192/3.22 |

FOREIGN PATENT DOCUMENTS 1033515 7/1958 Fed. Rep. of Germany .

OTHER PUBLICATIONS

"C-4 Automatic Transmission Technician Reference Manual"; Course 1705-104 LHB, pp. 1-53; Published: Nov., 1971; by: Ford Marketing Corporation.
"936 Wheel Loader Power Train, Systems Operation Testing and Adjusting"; Form No. SENR2908 for use in 936 Wheel Loader Service Manual No. SENR2906, Excerpts: pp. 28-31; Published: Sep., 1983; By: Caterpillar Tractor Co.
"Single Speed Power Shift Transmission, Service Manual"; Form No. SENB8110-02 for Use in T25, TC30 Lift Truck Service Manual No. SENB8050; pp. 1-14; Published: Feb., 1984; By: Caterpillar Tractor Co.
U.S. application Ser. No. 836,948; Filed Mar. 6, 1986 by A. R. Coutant.

Primary Examiner—Rodney H. Bonck
Assistant Examiner—David A. Testardi
Attorney, Agent, or Firm—Anthony N. Woloch

[57] ABSTRACT

A fluid pressure control system including a modulating pressure relief valve is normally needed in a power transmission having clutches that require smooth engagement. It is also desirable in many systems to maintain a difference in fluid pressure levels between the fluid in different selected clutches, such as speed range and directional clutches, during initial engagement. This arrangement ensures that the selected directional clutch engages only after the selected speed range clutch engages so that only the selected directional clutch absorbs the inertial load. In order to conserve horsepower, reduce fluid leakage, and thereby improve system efficiency and component reliability, it is also desirable to reduce the fluid pressure levels in the system once the selected clutches are fully engaged. The present fluid pressure control system provides a pressure cutback device which efficiently reduces the fluid pressures in the system to minimal but adequate levels soon after complete engagement of the selected clutches.

15 Claims, 4 Drawing Figures

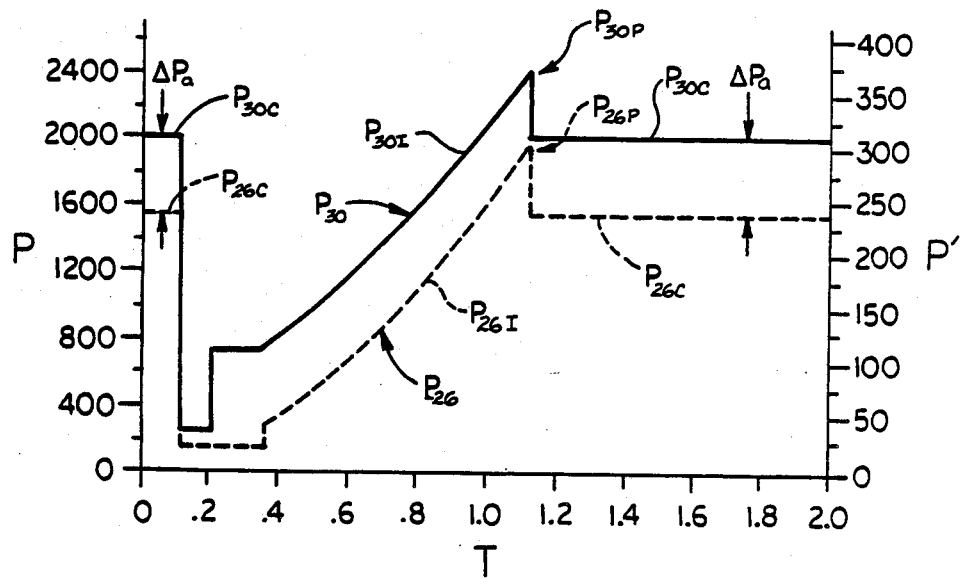

FLUID PRESSURE CONTROL SYSTEM HAVING A PRESSURE CUTBACK DEVICE

DESCRIPTION

1. Technical Field

This invention relates generally to a fluid pressure control system and, more particularly, to a transmission control system for selectively actuating at least one clutch or brake of a power transmission.

2. Background Art

As shown in, for example, U.S. Pat. No. 3,570,522 issued to Horsch et al. on Mar. 16, 1971, some heavy-duty vehicles such as earthmoving tractors have a multi-speed range and bidirectional vehicular power transmission which typically includes several force-transmitting mechanisms, such as hydraulically-actuated friction clutches. Some of the clutches are alternately engaged to select one of several available speed ranges while two other clutches are alternately engaged to select either a forward or reverse direction of vehicular travel. As generally shown in U.S. Pat. No. 3,042,165 issued to Yokel on July 3, 1962, some boats as well as some contemporary fork lift trucks have a more basic power transmission which merely operates at a single fixed speed range and includes only a pair of hydraulically-actuated friction clutches which are alternately engaged to select either a forward or reverse direction of travel.

In order to minimize mechanical shocks and wear to any of the above power transmissions and also minimize fatigue to the operator, a hydraulic transmission control system is provided and arranged to apply a modulated or gradually increasing hydraulic fluid pressure to the selected directional clutch and, if included in the system, the selected speed range clutch. The modulated increase in hydraulic fluid pressure to each selected clutch is normally chosen to span several tenths of a second causing the selected clutch to gradually slip less of the power transmitted by an engine to a drive shaft until that selected clutch is completely engaged or locked up so that no more slipping occurs.

The hydraulic transmission control system for a multi-speed range and bidirectional power transmission is also typically arranged so that the hydraulic fluid pressure communicated to the selected directional clutch at a given instant in time is relatively lower than the hydraulic fluid pressure communicated simultaneously to the selected speed range clutch. This arrangement ensures that the selected directional clutch will still dynamically slip at the time that the selected speed range clutch first becomes completely or statically engaged and also ensures that the selected directional clutch will subsequently completely engage in order to sustain the entire mechanical shock of reestablishing torque flow from the engine through the power transmission and to the drive shaft. Consequently, excessive wear on the speed range clutches is avoided which advantageously permits the speed range clutches to be made smaller and of a more economical construction in comparison to the two directional clutches which must be made relatively more durable.

The hydraulic transmission control system for any of the above power transmissions also relieves the hydraulic fluid pressures in the selected clutches when they exceed respective preselected peak hydraulic fluid pressures that are chosen to be sufficiently high to completely engage the respective selected clutches. In some current systems, once the selected clutches are completely engaged, the hydraulic fluid pressures therein remain relatively constant at their respective peak hydraulic fluid pressures until the power transmission is shifted to a neutral position or to another position which alternately selects another clutch. Once the power transmission is shifted to select another clutch, the fluid pressures in the hydraulic transmission control system momentarily drop to relatively low values and then again gradually increase until they level off again in a state of equilibrium at their respective peak hydraulic fluid pressures.

Even though it is necessary to attain the respective peak hydraulic fluid pressures in the selected clutches for initially achieving complete engagement, it is not necessary to continually remain at such relatively high peak hydraulic fluid pressures in order to maintain complete engagement once a certain amount of static friction is created in those completely engaged clutches. The certain amount of static friction, which depends upon the friction materials and structural design chosen at a reasonable cost for each clutch, in combination with a relatively lower preselected hydraulic fluid pressure communicated to each selected clutch would be sufficient to maintain engagement of that selected clutch. Maintaining the peak hydraulic fluid pressures in the hydraulic transmission control system for prolonged periods of time detracts from the overall efficiency of that system. Some efficiency is lost primarily in terms of horsepower wasted to continually pump hydraulic fluid through the control system at such unnecessarily high peak hydraulic fluid pressures and also in terms of more leakage of pressurized hydraulic fluid occurring through clearances between mating components of the hydraulic transmission control system. Such systems can also experience more durability problems with seals that are continually subjected to such unnecessarily high peak fluid pressures during steady-state operation.

As shown in U.S. Pat. No. 3,731,558 issued to Enomoto on May 8, 1973 and U.S. Pat. No. 3,897,698 issued to Ohsaka on Aug. 5, 1975, attempts have been made for improving the overall efficiency of a vehicular hydraulic transmission control system. In these arrangements, vehicular road speed is sensed by either a hydraulic governor or an electrical device and the hydraulic fluid pressure in each selected clutch is reduced from a respective peak hydraulic fluid pressure to a respective preselected cutback hydraulic fluid pressure only in response to the vehicle exceeding a certain minimum level of road speed.

However, such arrangements, controlled by sensing road speed, are considered somewhat inefficient because sensing road speed does not immediately and accurately indicate when the hydraulic fluid pressures in the selected clutches can be properly reduced to the cutback hydraulic fluid pressures. For example, the hydraulic fluid pressure in a selected clutch will not be reduced from its peak hydraulic fluid pressure, even though that clutch is already completely engaged, as long as the vehicle remains below the certain minimum level of road speed necessary for triggering the reduction of hydraulic fluid pressure. Moreover, some of these arrangements utilizing a hydraulic governor are merely able to cutback the peak fluid pressure only when the vehicle is traveling in a forward direction and not in a reverse direction. On the other hand, a hydraulic transmission control system must not prematurely or accidently reduce the hydraulic fluid pressure in a selected clutch before that clutch is completely engaged to produce static friction; otherwise, that clutch will continue dynamically slipping at the cutback hydraulic fluid pressure. Prolonged slippage of the selected clutch is undesirable since it may eventually cause overheating which damages that selected clutch.

The present invention is directed to overcoming one or more of the problems as set forth above.

DISCLOSURE OF THE INVENTION

In one aspect of the present invention, a fluid pressure control system is disclosed having a fluid reservoir, a source of pressurized fluid connected to the fluid reservoir, a fluid-actuated force-transmitting mechanism, a selector valve means connected between the source and the force-transmitting mechanism for selectively directing pressurized fluid from the source to the force-transmitting mechanism, and a modulating pressure relief valve means connected between the source and the selector valve means. The modulating pressure relief valve means provides a preselected modulated increase in fluid pressure in the force-transmitting mechanism in response to the selector valve means initially directing pressurized fluid to the selected force-transmitting mechanism and also relieves the fluid pressure above a predetermined peak fluid pressure. The modulated increase in fluid pressure is considered completed when the modulated fluid pressure substantially stops increasing upon initially reaching the peak fluid pressure. The modulating pressure relief valve means includes a relief valve spool defining a first reaction chamber. The first reaction chamber has a preselected first effective surface area which determines the magnitude of the peak fluid pressure. The fluid pressure control system further includes a sensing means for sensing and signaling the completion of the modulated increase in fluid pressure and a pressure cutback means which is triggered by the sensing means signaling the completion of the modulated increase in fluid pressure. Once it is triggered, the pressure cutback means automatically reduces the fluid pressure in the selected force-transmitting mechanism from the peak fluid pressure to a predetermined cutback fluid pressure. The pressure cutback means includes a second reaction chamber, defined by the relief valve spool, having a preselected second effective surface area. The second effective surface area is larger in magnitude than the first effective surface area and determines the magnitude of the cutback fluid pressure when the second reaction chamber is pressurized with fluid. The sensing means includes a directing means for directing pressurized fluid to the second reaction chamber upon completion of the modulated increase in fluid pressure.

In another aspect of the present invention, a multiple fluid pressure control system is disclosed having a fluid reservoir, a source of pressurized fluid connected to the fluid reservoir, a fluid supply line including a downstream conduit and an upstream conduit wherein the upstream conduit is connected between the source and the downstream conduit, and a flow restricting means disposed between the upstream and downstream conduits for restricting fluid flow in the fluid supply line and thereby establishing a preselected difference in fluid pressures in the upstream and downstream conduits. The multiple fluid pressure control system further includes a first fluid-actuated force-transmitting mechanism connected to the upstream conduit, a first selector valve means connected to the upstream conduit for selectively directing pressurized fluid from the upstream conduit to the selected first force-transmitting mechanism, a second fluid-actuated force-transmitting mechanism connected to the downstream conduit, a second selector valve means connected to the downstream conduit for selectively directing pressurized fluid from the downstream conduit to the selected second force-transmitting mechanism, and a modulating pressure relief valve means connected to the downstream conduit between the flow restricting means and the second selector valve means. The modulating pressure relief valve means provides, in combination with the flow restricting means, dual preselected modulated increases in fluid pressures in the respective upstream and downstream conduits and also the respective selected first and second force-transmitting mechanisms in response to each of the selector valve means initially directing pressurized fluid to their respective selected force-transmitting mechanisms. The modulating pressure relief valve means also relieves the fluid pressures above respective predetermined peak fluid pressures. The dual modulated increases in fluid pressures are considered completed when each of the modulated fluid pressures substantially stops increasing upon initially reaching its respective peak fluid pressure. The modulating pressure relief valve means includes a relief valve spool defining a first reaction chamber. The first reaction chamber is arranged in continuous fluid communication with the downstream conduit and has a preselected first effective surface area. The first effective surface area determines the magnitude of the peak fluid pressure in the selected second force-transmitting mechanism and the downstream conduit. The multiple fluid pressure control system further includes a sensing means for sensing and signaling the completion of the dual modulated increases in fluid pressures and a pressure cutback means which is triggered by the sensing means signaling the completion of the dual modulated increases in fluid pressures. Once it is triggered, the pressure cutback means automatically reduces the fluid pressures in both of the selected force-transmitting mechanisms and the conduits to respective predetermined cutback fluid pressures. The pressure cutback means includes a second reaction chamber, defined by the relief valve spool, which has a preselected second effective surface area. The second effective surface area is larger in magnitude than the first effective surface area. The second effective surface area determines the magnitude of the cutback fluid pressure in the selected second force-transmitting mechanism and the downstream conduit when the second reaction chamber is pressurized with fluid. The sensing means includes a directing means for directing pressurized fluid to the second reaction chamber upon completion of the dual modulated increases in fluid pressure.

The present invention provides a relatively compact and foolproof fluid pressure control system for positively ensuring that the one or more selected force-transmitting mechanisms are smoothly and completely engaged by providing thereto a modulated fluid pressure which gradually increases up to a required peak fluid pressure. Then the fluid pressure control system automatically reduces the fluid pressure to a preselected cutback fluid pressure of a sufficient magnitude to maintain complete engagement of the selected force-transmitting mechanism. This arrangement increases system efficiency in terms of conserving horsepower, improving component reliability, and minimizing fluid leakage by operating the transmission control system at a relatively lower but adequate fluid pressure level under steady-state conditions soon after complete engagement of the selected force-transmitting mechanism.

BRIEF DESCRIPTION OF THE DRAWINGS

FIG. 4 is an exemplary fluid pressure versus time graph showing the different fluid pressures which theoretically exist in the upstream and downstream conduits associated with the operation of the hydraulic transmission control system shown in FIGS. 1-3.

BEST MODE FOR CARRYING OUT THE INVENTION

Figure 1:
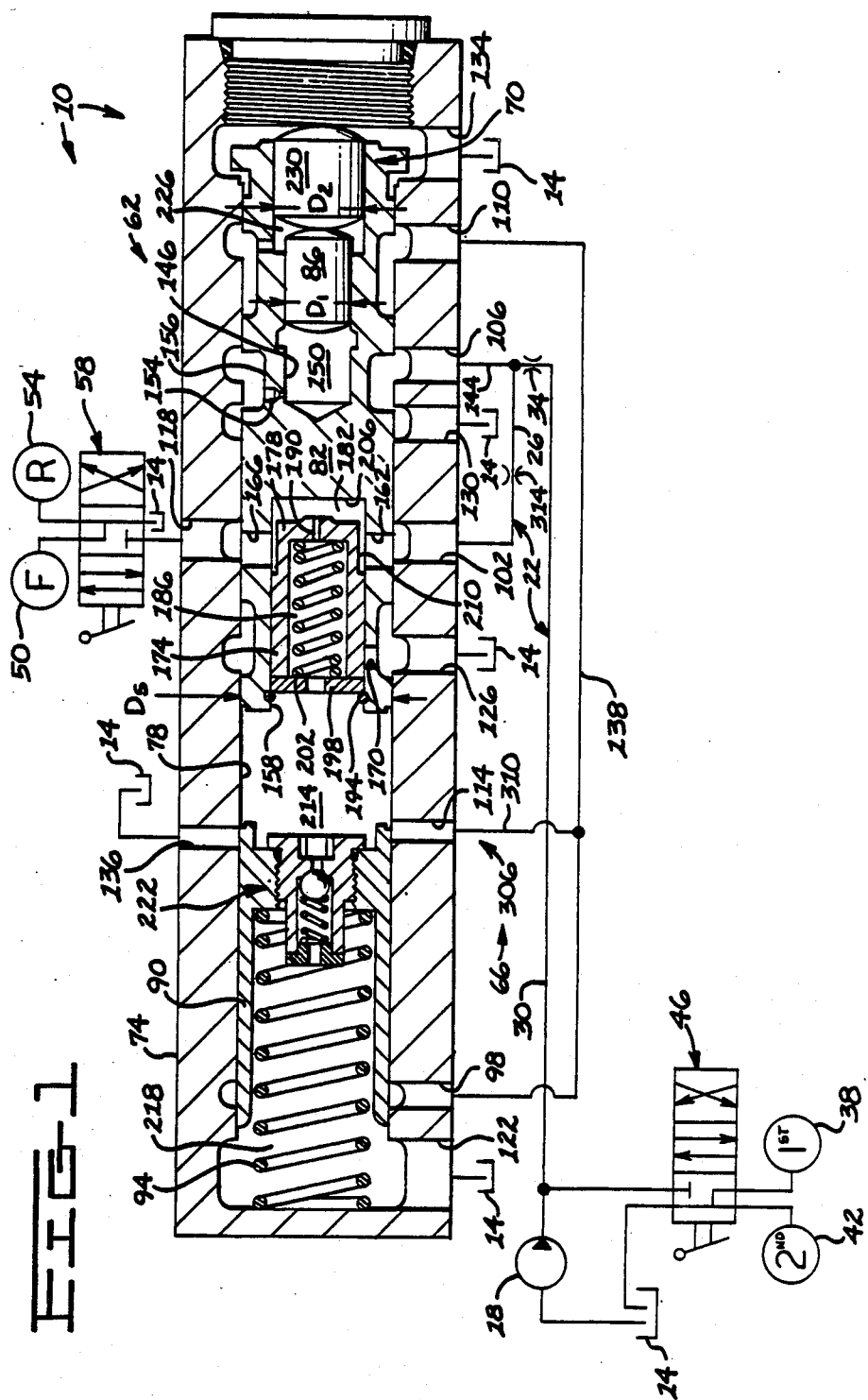
FIG. 1 is a partially schematic and partially diagrammatic representation of a hydraulic transmission control system incorporating an embodiment of the present invention and shown in an operating but neutral equilibrium condition.

Referring to FIGS. 1-4 wherein similar reference numerals designate similar elements or features in all of the views, one embodiment of a multiple fluid pressure control system 10 is shown for use as a hydraulic transmission control system in a vehicle (not shown). Although the fluid pressure control system is specifically illustrated for use as a multi-speed range and bidirectional hydraulic transmission control system, it should be kept in mind that the present invention is also applicable to a single-speed range and bidirectional hydraulic transmission control system. Furthermore, the present invention is applicable to an even more basic system which merely controls the fluid pressure directed to a single fluid-actuated force-transmitting mechanism.

Referring to FIG. 1, the fluid pressure control system 10 comprises a hydraulic fluid reservoir 14, a source 18 of pressurized hydraulic fluid such as a positive-displacement pump connected to the fluid reservoir 14, a fluid supply line 22 including a downstream conduit 26 and an upstream conduit 30 wherein the upstream conduit 30 is connected in series relation between the source 18 and the downstream conduit 26, and a flow restricting means 34. The flow restricting means 34, such as a first fixed-flow-area orifice, is connected between the upstream and downstream conduits 30,26 for restricting fluid flow in the fluid supply line 22 and thereby establishing during system operation a preselected difference (delta $P_a$) in fluid pressures $P_{30}, P_{26}$ in the upstream and downstream conduits 30,26.

The fluid pressure control system 10 further includes at least one and preferably a plurality of first fluid-actuated force-transmitting mechanisms 38,42 such as first and second speed range friction clutches or brakes connected to the upstream conduit 30, and a first selector valve means 46 connected to the upstream conduit 30 for selectively directing pressurized fluid from the upstream conduit 30 to a selected one of the first force-transmitting mechanisms 38,42. The fluid pressure control system 10 further includes at least one and preferably a pair of second fluid-actuated force-transmitting mechanisms 50,54 such as forward and reverse direction friction clutches or brakes connected to the downstream conduit 26, and a second selector valve means 58 connected to the downstream conduit 26 for selectively directing pressurized fluid from the downstream conduit 26 to a selected one of the second force-transmitting mechanisms 50,54.

The fluid pressure control system 10 further includes a modulating pressure relief valve means 62 connected to the downstream conduit 26 between the first flow restricting means 34 and the second selector valve means 58. The modulating pressure relief valve means 62 provides, in combination with the flow restricting means 34, dual preselected modulated increases $P_{30I}, P_{26I}$ in fluid pressures $P_{30}, P_{26}$ in the respective upstream and downstream conduits 30,26 and the respective selected first and second force-transmitting mechanisms in response to each of the selector valve means 46,58 initially directing pressurized fluid to their respective selected force-transmitting mechanisms. The modulating pressure relief valve means 62 eventually relieves the fluid pressures $P_{30}, P_{26}$ above respective predetermined peak fluid pressures $P_{30P}, P_{26P}$. The dual modulated increases $P_{30I}, P_{26I}$ in fluid pressures $P_{30}, P_{26}$ are considered completed when each of the modulated fluid pressures substantially stops increasing upon initially reaching its respective peak fluid pressure $P_{30P}, P_{26P}$.

The fluid pressure control system 10 further includes a sensing means 66 for directly sensing and positively signalling the completion of the dual modulated increases $P_{30I}, P_{26I}$ in fluid pressures $P_{30}, P_{26}$ and also a pressure cutback means 70 which is immediately triggered by the sensing means 66 signalling the completion of the dual modulated increases $P_{30I}, P_{26I}$ in fluid pressures $P_{30}, P_{26}$. Once triggered, the pressure cutback means 70 automatically and immediately reduces the fluid pressures in both of the selected force-transmitting mechanisms and both of the conduits 30,26 to respective predetermined cutback fluid pressures $P_{30C}, P_{26C}$. These reductions in fluid pressures automatically occur while the first and second selector valve means 46,58 continue to direct pressurized fluid to the respective selected first and second force-transmitting mechanisms 38,42;50,54.

The modulating pressure relief valve means 62 includes a valve body 74 defining a valve body bore 78, a single relief valve spool 82 reciprocably and sealedly disposed in the valve body bore 78, a first cylindrical reaction slug 86, a cup-shaped load piston 90 also reciprocably and sealedly disposed in the valve body bore 78, and a helical compression spring 94. The spring 94 is disposed in the valve body bore 78 such that the load piston 90 is axially positioned between the spring 94 and the relief valve spool 82. The spring 94 resiliently biases the load piston 90 to a first position towards and preferably directly against the relief valve spool 82.

The valve body 74 defines a plurality of separate inlet ports 98,102,106,110, a plurality of separate outlet ports 114,118, and a plurality of separate drain ports 122,126,130,134,136 wherein all of the above valve body ports radially intersect the valve body bore 78 at various mutually spaced locations along its longitudinal axis. The inlet port 102 is arranged in continuous fluid communication with the downstream conduit 26. A feedback conduit 138 connects the inlet port 98 to the inlet port 110. A downstream conduit branch 144 connects the downstream conduit 26 to the inlet port 106. All of the drain ports 122,126,130,134,136 of the valve body 74 are arranged in continuous fluid communication with the fluid reservoir 14. Alternatively, the drain port 130 may be connected to a relatively-low-fluidpressure element such as a torque converter (not shown) or a relatively-low-fluid-pressure lubrication system.

One longitudinal end portion of the relief valve spool 82 defines a first longitudinal blind bore 146 which partially defines a first reaction chamber 150. The first reaction chamber 150 is arranged to be in continuous fluid communication with the inlet port 106 of the valve body 74 via a radial orificed passage 154 and a circumferential groove 156 defined in the relief valve spool 82. The first reaction chamber 150 has a preselected first effective fluid-force-transmitting surface area $A_1$ which primarily determines the magnitude of the peak fluid pressures $P_{30P}, P_{26P}$. The first reaction slug 86 is slidably and sealedly disposed in the first reaction chamber 150 and has a diameter $D_1$ defining a transverse circular cross-sectional area equal to the first effective surface area $A_1$ of the first reaction chamber 150. Another opposite longitudinal end portion of the relief valve spool 82 has an outside diameter $D_S$ defining a circular cross-sectional area $A_S$. The area $A_S$ is chosen to be greater than the first effective surface area $A_1$ by a predetermined factor which, for example, may have a magnitude of four.

The another end portion of the relief valve spool 82 also defines a second longitudinal blind bore 158 and a pair of diametrically-opposed inlet and outlet ports 162,166 which radially intersect the second blind bore 158. The another end portion of the relief valve spool 82 further defines a drain port 170 which radially intersects the second blind bore 158 and is arranged in continuous fluid communication with the drain port 126 of the valve body 74.

The relief valve spool 82 further includes a separate cup-shaped reset valve 174 reciprocably and sealedly disposed in the second blind bore 158. A circular bottom wall 178 of the reset valve 174 divides the second blind bore 158 into a pair of chambers 182,186 which are mutually connected by a second fixed-flow-area orifice 190 defined centrally through the bottom wall 178. Associated with the reset valve 174 are a snap ring 194, a washer 198, and a relatively-low-rate helical compression spring 202 all of which are disposed within the second blind bore 158 for biasing the reset valve 174 rightwardly to a first position. At its first position, the reset valve concurrently seats against a bottom wall 206 of the second blind bore 158 and opens fluid communication between the chamber 186 of the reset valve 174 and the drain port 170 of the relief valve spool 82. A cylindrical exterior side wall of the reset valve 174 defines an annular groove 210 which is arranged in continuous fluid communication with the inlet and outlet ports 162,166 of the relief valve spool 82 and also the inlet and outlet ports 102,118 of the valve body 74. Other configurations for the reset valve 174 may be substituted for the one illustrated provided they basically function to momentarily vent fluid pressure in the chamber 186 in response to either selector valve means 46,58 initially directing pressurized fluid to an unfilled respective selected force-transmitting mechanism.

One longitudinal end portion of the load piston 90 defines in conjunction with the another end portion of the relief valve spool 82 an expandable and contractable modulating pressure chamber 214 therebetween. The modulating pressure chamber 214 is arranged in fluid communication with the chamber 186 via a nonrestrictive central opening in the washer 198. An opposite longitudinal end portion of the load piston 90 defines, in conjunction with the valve body 74, a drain chamber 218 which is arranged in continuous fluid communication with the drain port 122 of the valve body 74. The one end portion of the load piston 90 includes an auxiliary ball-check relief valve 222 threadedly connected thereto. The auxiliary relief valve 222 is adapted to relieve the modulating pressure chamber 214 directly to the drain chamber 218 only when the fluid pressure in the modulating pressure chamber 214 exceeds a predetermined maximum limit fluid pressure $P_M$. The maximum limit fluid pressure $P_M$ is chosen to be somewhat greater in magnitude than the chosen fluid pressure $P_{214}$ in the modulating pressure chamber 214 when the load piston 90 is at a second position.

The pressure cutback means 70 includes a second reaction chamber 226, internally defined by the relief valve spool 82, and a second cylindrical reaction slug 230 slidably and sealedly disposed in the second reaction chamber 226. The second reaction chamber 226 has a preselected second effective fluid-force-transmitting surface area $A_2$ which is larger in magnitude than the first effective surface area $A_1$ but smaller in magnitude than the cross sectional area $A_S$ of the relief valve spool 82. The second effective surface area $A_2$ primarily determines the magnitude of the cutback fluid pressures $P_{30C}, P_{26C}$ when the second reaction chamber 226 is pressurized with fluid. The second reaction chamber 226 is arranged in continuous fluid communication with the inlet port 110 of the valve body 74.

The second reaction slug 230 has a diameter $D_2$ defining a transverse circular cross-sectional area equal to the second effective surface area $A_2$ of the second reaction chamber 226. For compactness, the second reaction slug 230 is preferably disposed in a counterbore of the first blind bore 146 and is axially positioned between and is directly contactable with both the first reaction slug 86 and a removable access plug of the valve body 74.

The sensing means 66 includes a directing means 306 for directing pressurized fluid to the second reaction chamber 226 immediately upon completion of the dual modulated increases $P_{30I}, P_{26I}$ in fluid pressures $P_{30}, P_{26}$. The directing means 306 includes a signal conduit 310 connected between the outlet port 114 of the valve body 74 and the feedback conduit 138. The signal conduit 310 is arranged so that fluid communication between the outlet port 114 of the modulating pressure chamber 214 and the signal conduit 310 is blocked by the load piston 90 at its first position and further arranged so that fluid communication between the modulating pressure chamber 214 and the signal conduit 310 is opened by the load piston 90 at its second position. The drain port 136 of the valve body 74 is arranged relative to the outlet port 114 so that the load piston 90 at its first position blocks fluid communication between the modulating pressure chamber 214 and the drain port 136. Moreover, the drain port 136 is arranged so that movement of the load piston 90 away from its first position and leftwardly beyond its second position opens fluid communication between the modulating pressure chamber 214 and the drain port 136.

Preferably for compactness, the fluid supply line 22, the feedback conduit 138, the downstream conduit branch 144, and the signal conduit 310 are all integrally formed with the valve body 74 of the modulating pressure relief valve means 62 in a single casting. Furthermore, the downstream conduit 26 defines a third fixed-flow-area orifice 314 which is sufficiently restrictive to fluid flow for quickly dropping the fluid pressure in the chamber 182, when the second selector valve means 58 is initially shifted, in order to help ensure that the reset valve 174 quickly moves rightwardly from its second position to its first position. However, the third orifice 314 is not too restrictive to fluid flow so as to unduly prolong the time it takes to fill the selected second force-transmitting mechanism 50,54.

Each of the first and second selector valve means 46,58 is of a conventional construction and includes a selector valve spool (not shown) disposed in the fluid supply line 22. Each selector valve spool is axially shiftable between a neutral position and one or more operating positions. Each selector valve spool at its neutral position concurrently blocks fluid communication between the source 18 and all of the respective force-transmitting mechanisms 38,42;50,54 and opens fluid communication between all of the respective force-transmitting mechanisms and the fluid reservoir 14 so that all of the respective force-transmitting mechanisms are vented. Each selector valve spool at one of its operating positions concurrently opens fluid communication between the source 18 and the respective selected force-transmitting mechanism, blocks fluid communication between the respective selected force-transmitting mechanism and the fluid reservoir 14, and maintains open fluid communication between the respective nonselected force-transmitting mechanisms and the fluid reservoir 14.

Although not illustrated, it can be readily appreciated that a more basic alternative embodiment of FIGS. 1-4 for a single fixed speed range and bidirectional power transmission would generally exhibit the elimination of the first force-transmitting mechanisms 38,42, the first selector valve means 46, and the flow restricting means 34 shown in FIG. 1. In this last-mentioned embodiment, the fluid pressure control system 10 would merely control the fluid pressure $P_{26}$ to the fluid supply line 22 and a selected one of the second force-transmitting mechanisms 50,54. An even more basic alternative embodiment for a single fixed speed and unidirectional power transmission would generally exhibit the further elimination of all but one of the second force-transmitting mechanisms.

INDUSTRIAL APPLICABILITY

While the operation of the present invention is believed clearly apparent from the foregoing description, further amplification will be made in the following brief summary of such operation.

Figure 2:
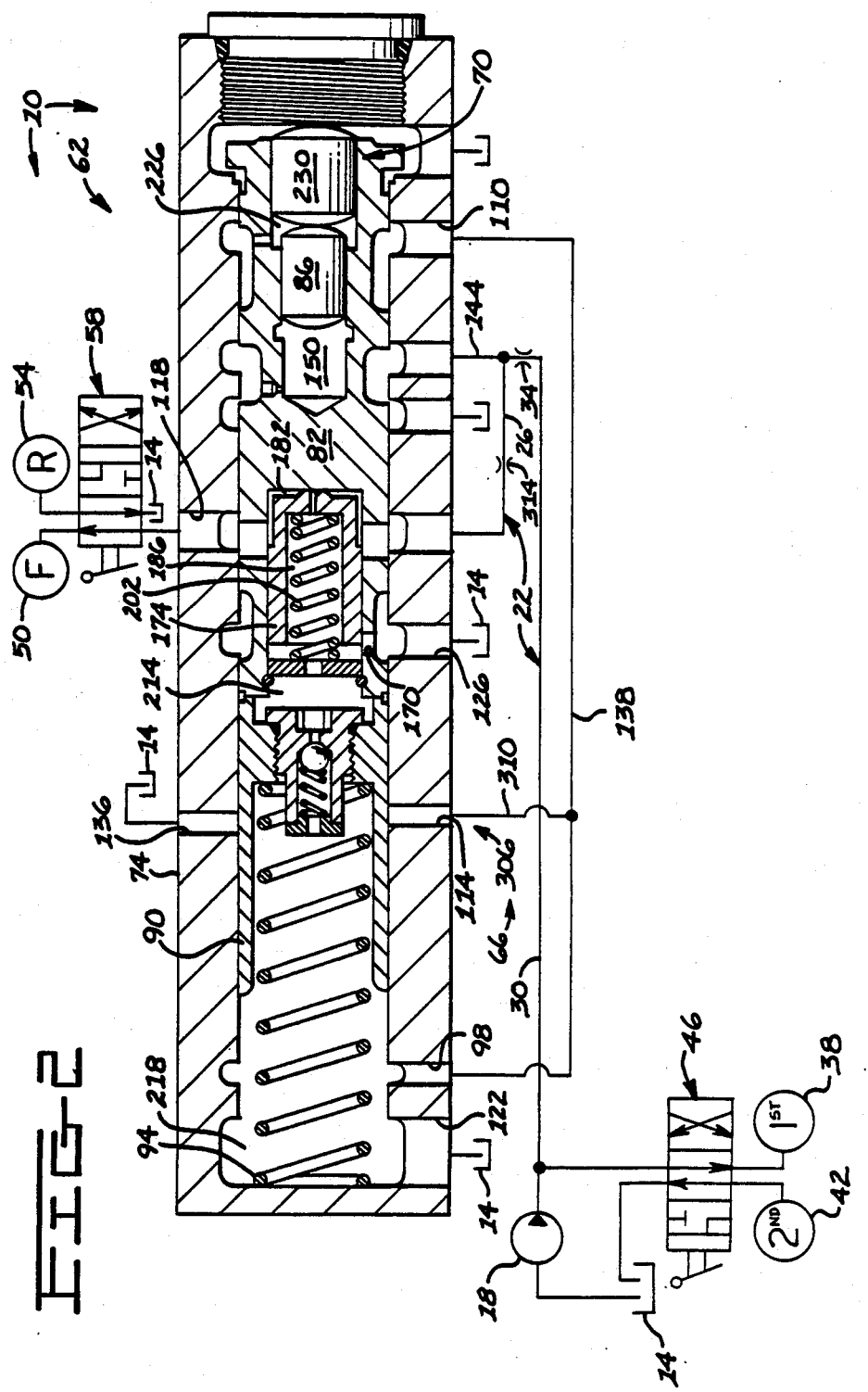
FIG. 2 is a view similar to FIG. 1 but showing an initial stage of one exemplary mode of operation corresponding to selection of a first speed range and a forward direction of travel.
Figure 3:
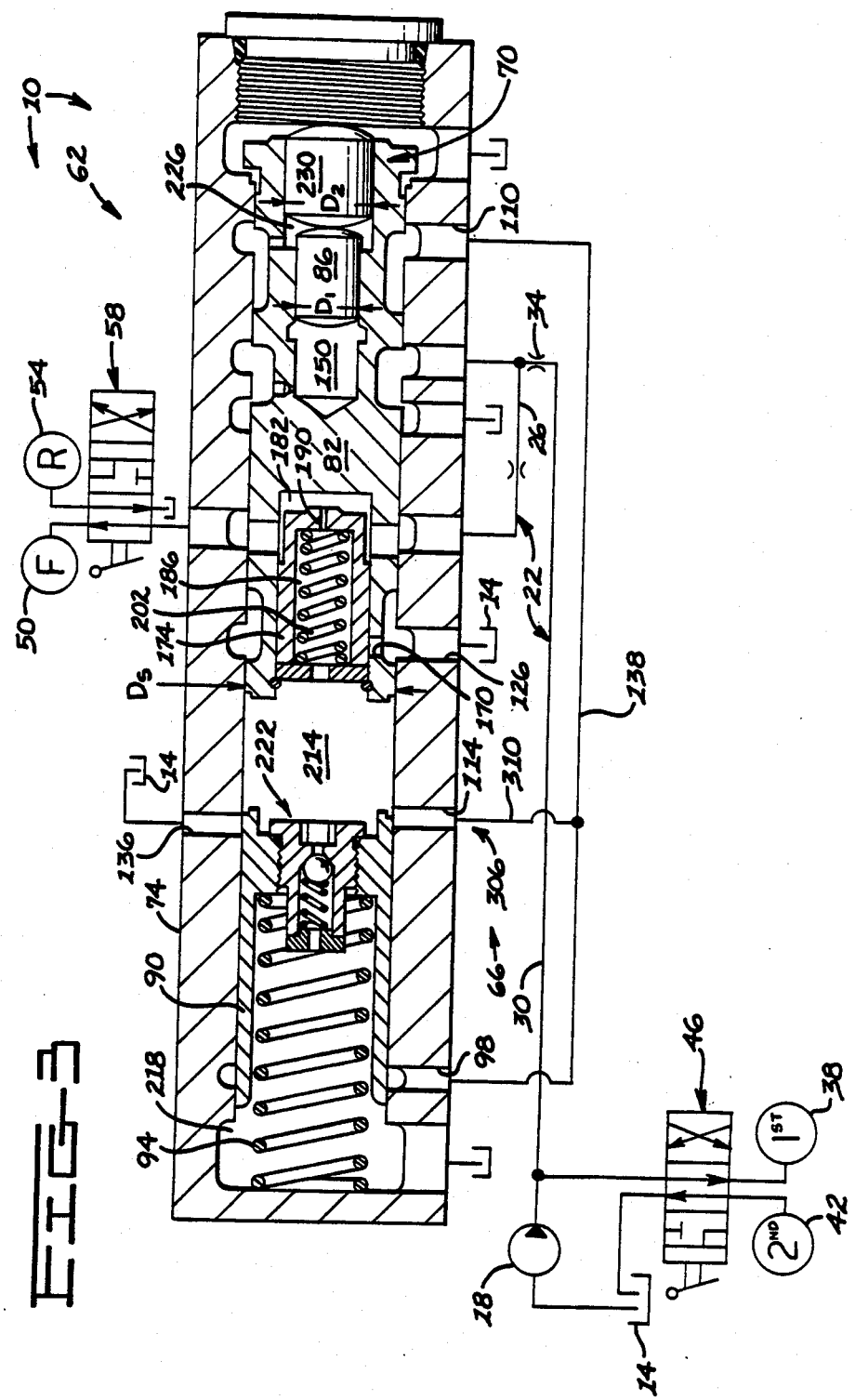
FIG. 3 is a view similar to FIG. 2 but showing another sequential stage of the one mode of operation.

FIG. 4 graphically illustrates the theoretical operation of the embodiment of the multiple fluid pressure control system 10 shown in FIGS. 1-3. In FIG. 4, the hydraulic fluid pressure $P_{30}$ existing in the upstream conduit 30 and a selected one of the first force-transmitting mechanisms 38,42 is shown as a solid line and is plotted as a function of time T measured in seconds. Similarly, the relatively lower hydraulic fluid pressure $P_{26}$ existing in the downstream conduit 26 and a selected one of the second force-transmitting mechanisms 50,54 is shown as a dashed line and is also plotted as a function of time. The left vertical axis P for the hydraulic fluid pressures $P_{30}, P_{26}$ is measured in units of kilopascals (kPa) while the right vertical axis P' for the hydraulic fluid pressures $P_{30}, P_{26}$ is measured in units of pounds-force per square inch (psi). It should be understood that the theoretical fluid pressure lines in FIG. 4 are somewhat smoother in appearance than the actual ones.

In FIG. 1, the multiple fluid pressure control system 10 is shown in an operating but neutral equilibrium condition corresponding to time T equals zero seconds in FIG. 4. In the neutral condition, each of the first and second selector valve means 46,58 concurrently blocks fluid communication from the fluid supply line 22 to all of their respective force-transmitting mechanisms 38,42;50,54 and opens fluid communication from all of their respective force-transmitting mechanisms to the fluid reservoir 14. Thus, all of the force-transmitting mechanisms are unpressurized, completely disengaged, and substantially empty of hydraulic fluid.

Pressurized hydraulic fluid from the source 18 is supplied through the upstream conduit 30, the flow restricting means 34, and the downstream conduit 26 to the first and second reaction chambers 150,226 of the modulating pressure relief valve means 62. Pressurized hydraulic fluid from the downstream conduit 26 is supplied to the chamber 182 for hydraulically maintaining the reset valve 174 at a second position shown in FIG. 1 at which the reset valve compresses the spring 202 and blocks fluid communication between the chamber 186 and the drain port 170 of the relief valve spool 82. Thus, pressurized hydraulic fluid from the chamber 182 is supplied through the second orifice 190 and the chamber 186 to the modulating pressure chamber 214 for hydraulically maintaining the load piston 90 at its second position shown in FIG. 1.

The load piston 90 at its second position concurrently compresses the spring 94, blocks the inlet port 98 of the drain chamber 218, and opens the outlet port 114 of the modulating pressure relief chamber 214. Thus, pressurized hydraulic fluid from the modulating pressure chamber 214 is supplied through the signal conduit 310 and the feedback conduit 138 to the second reaction chamber 226. As shown in FIG. 1, further leftward movement of the load piston 90 is limited by the opposing force of the spring 94 when the load piston uncovers the drain port 136 of the valve body 74. Thus, any excess fluid pressure in the modulating pressure chamber 214 is relieved until the unbalanced opposing force of the compressed spring 94 causes the load piston 90 to move to an equilibrium position. At its equilibrium position, the load piston 90 partially covers the drain port 136 in order to maintain a hydraulic force in the modulating pressure chamber 214 which equally opposes the force of the compressed spring 94.

Since the second reaction chamber 226 is pressurized with fluid, the relief valve spool 82 maintains the fluid pressure in the downstream conduit 26 at the cutback fluid pressure $P_{26C}$ and relieves, transversely across its circumferential groove 156, excess hydraulic fluid pressure from the inlet port 106 to the drain port 130 of the valve body 74. The orificed passage 154 through which fluid must pass to and be displaced from the first reaction chamber 150, as the relief valve spool 82 moves axially, helps dampen and stabilize axial movement of the relief valve spool 82. The orificed passage 154 also helps isolate the relief valve spool from axially moving in response to inherent fluid pressure fluctuations caused by the positive displacement pump 18. Since the upstream conduit 30 is connected to the downstream conduit 26 by the flow restricting means 34, the fluid pressure in the upstream conduit 30 is maintained at the cutback fluid pressure $P_{30C}$. The cutback fluid pressure $P_{30C}$ in the upstream conduit 30 and the selected first force-transmitting mechanism 38 is higher in magnitude than the cutback fluid pressure $P_{26C}$ in the downstream conduit 26 by the amount of the preselected difference (delta $P_a$) in fluid pressures.

FIGS. 2 and 3 illustrate the sequential and transient operation of the multiple fluid pressure control system 10 at time T equals, for example, approximately 0.1 seconds in FIG. 4 upon shifting the first and second selector valve means 46,58 into one of the modes of operation such as the first speed range and the forward direction of vehicular travel. Due to the required filling of fluid into the selected first and second force-transmitting mechanisms 38,50, the fluid pressure in the fluid supply line 22 immediately drops to a relatively low level causing several things to happen. The fluid pressure in the chamber 182 also drops allowing the compressed spring 202 to expand to axially move the reset valve 174 rightwardly to its first position shown in FIG. 2. At its first position, the reset valve 174 opens the drain port 170 and rapidly vents fluid pressure from the chamber 186 and the modulating pressure chamber 214.

Due to the absence of fluid pressure in the modulating pressure chamber 214, the compressed spring 94 shown in FIG. 1 expands and rapidly moves the load piston 90 rightwardly to its first position shown in FIG. 2. While axially moving from its second position to its first position, the load piston 90 blocks the outlet port 114 of the valve body 74 and then uncovers the inlet port 98 of the drain chamber 218 so that fluid pressure in the second reaction chamber 226 is rapidly vented via the feedback conduit 138. Thus, it is apparent that the reset valve 174 functions to reset the load piston 90 to its first position in order to ensure subsequent modulation of the fluid pressures $P_{30}, P_{26}$.

Once the selected first and second force-transmitting mechanisms 38,50 are filled with hydraulic fluid but are still completely disengaged, the fluid pressure in the fluid supply line 22 begins to increase. The fluid pressure in the chamber 182 also increases and consequently hydraulically moves the reset valve 174 leftwardly to its second position shown in FIG. 3 where it blocks the drain port 170 of the relief valve spool 82. The increasing fluid pressure in the chamber 182 is directed through the second orifice 190 and to the modulating pressure chamber 214.

At time T equals, for example, approximately 0.35 seconds in FIG. 4, the increasing fluid pressure in the modulating pressure chamber 214 begins to gradually move the load piston 90 leftwardly from its first position shown in FIG. 2 and towards its second position shown in FIG. 3 in opposition to the increasing force of the gradually compressed spring 94. While the load piston 90 is gradually moved leftwardly, the relief valve spool 82 is continually rebalancing two opposing forces acting on it according to the following equation:

$$(P_{214})(A_S) = (P_{150})(A_1)$$

where
$P_{214}$ = the increasing fluid pressure in the modulating pressure relief chamber 214;
$A_S$ = the circular cross-sectional area of the another end portion of the relief valve spool 82;
$P_{150}$ = the increasing fluid pressure in the first reaction chamber 150; and
$A_1$ = the first effective surface area of the first reaction chamber 150.

It should be apparent that if, for example, the area $A_S$ is chosen to be four times larger than the first effective surface area $A_1$, then the fluid pressure $P_{214}$ is four times smaller than the fluid pressure $P_{150}$. Consequently, the relief valve spool 82 continually relieves the fluid pressure $P_{26}$ in the downstream conduit 26 and the selected second force-transmitting mechanism 50 at a higher and higher fluid pressure as represented by the modulated increase $P_{26I}$ in fluid pressure shown in FIG. 4. Simultaneously, the fluid pressure $P_{30}$ in the upstream conduit 30 and the selected first force-transmitting mechanism 38 gradually increases as represented by the modulated increase $P_{30I}$ in fluid pressure shown in FIG. 4. The modulated increases $P_{30I}, P_{26I}$ in fluid pressures are chosen to span several tenths of a second by appropriate sizing of the fluid flow restriction in the second orifice 190 and the volume of the modulated pressure chamber 214 when the load piston 90 reaches its second position. Such a span of time is sufficient to ensure that the selected force-transmitting mechanisms 38,50 smoothly and gradually engage to minimize inertial shock.

Also during this span of time, the modulated increase $P_{30I}$ in fluid pressure in the selected first force-transmitting mechanism 38 is deliberately chosen to be relatively higher than the modulated increase $P_{26I}$ in fluid pressure in the selected second force-transmitting mechanism 50. This difference in fluid pressures ensures that the selected second force-transmitting mechanism 50 continues dynamically slipping at the time the selected first force-transmitting mechanism 38 first becomes completely engaged so that the selected second force-transmitting mechanism 50 will subsequently completely engage. Thus, only the selected second force-transmitting mechanism 50 sustains the entire mechanical shock of reestablishing torque flow from the engine through the power transmission and to the drive shaft. The difference in fluid pressures or pressure drop between the upstream and downstream conduits 30,26 is chosen in accordance with the size of the flow restriction in the flow restricting means 34.

That difference in fluid pressures assumes the preselected difference (delta $P_a$) in fluid pressures when the load piston 90 initially reaches its second position at time T equals, for example, approximately 1.1 seconds in FIG. 4. Initially, at the second position of the load piston 90, the fluid pressure $P_{30}$ in the upstream conduit 30 and the selected first force-transmitting mechanism 38 and also the fluid pressure $P_{26}$ in the downstream conduit 26 and the selected second force-transmitting mechanism 50 substantially stop increasing upon reaching their respective peak fluid pressures $P_{30P}, P_{26P}$. Such peak fluid pressures $P_{30P}, P_{26P}$ are preferably chosen to be of magnitudes which are sufficient to completely engage the respective selected force-transmitting mechanisms 38,50.

Just prior to reaching its second position, the load piston 90 blocks the inlet port 98 of the drain chamber 218 and, upon reaching its second position, opens the outlet port 114 of the modulating pressure chamber 214. Following the flow path of least resistance, pressurized fluid in the modulating pressure chamber 214 stops moving the load piston 90 leftwardly in opposition to the force of the compressed spring 94 and is instead directed by and through the signal conduit 310 to the second reaction chamber 226. The arrangement of the signal conduit 310 and the outlet port 114 in the valve body 74 relative to the modulating pressure chamber 214 and the second reaction chamber 226, positively ensures that the second reaction chamber 226 is not pressurized with fluid until the load piston 90 reaches its leftward second position. In other words, a proper sequence of operation is positively assured in the sense that the cutback in fluid pressures is not triggered until the preselected peak fluid pressures $P_{30P}, P_{26P}$ are both reached to ensure complete engagement of the selected force-transmitting mechanisms 38,50.

Since the inlet port 110 is blocked from communicating with the drain chamber 218, the second reaction chamber 226 of the relief valve spool 82 almost immediately becomes pressurized with fluid so that the relief valve spool 82 must now rebalance the two opposing forces acting on it according to the following second equation:

$$(P_{214})(A_S) = (P_{150})(A_1) + (P_{226})[(A_2) - (A_1)]$$

which can be rewritten as $$(P_{214})(A_S) - (P_{226})[(A_2) - (A_1)] = (P_{150})(A_1)$$

which can be rewritten as $$(P_{214})(A_S) - (P_{214})[(A_2) - (A_1)] = (P_{150})(A_1)$$

where
- $P_{214}$ = the fluid pressure in the modulating pressure relief chamber 214;
- $A_S$ = the circular cross-sectional area of the another end portion of the relief valve spool 82;
- $P_{150}$ = the fluid pressure in the first reaction chamber 150;
- $A_1$ = the first effective surface area of the first reaction chamber 150;
- $P_{226}$ = the fluid pressure in the second reaction chamber 226 which is approximately equal to the fluid pressure $P_{214}$ in the modulating pressure relief chamber 214; and
- $A_2$ = the second effective surface area of the second reaction chamber 226.

A comparison of the first and second equations explains why the cutback in fluid pressures occurs. Since the second effective surface area $A_2$ is chosen to be greater than the first effective surface area $A_1$, the left-hand side of the second equation as last rewritten must decrease in magnitude. Consequently, the right-hand side of the second equation as finally rewritten must also decrease. Therefore, the fluid pressure $P_{150}$ from the second equation must be and is in fact less than the fluid pressure $P_{150}$ from the first equation which had existed when the load piston 90 opened fluid communication between the second reaction chamber 226 and the drain chamber 218.

Thus, the relief valve spool 82 now relieves the fluid pressure in the downstream conduit 26 and the selected second force-transmitting mechanism 50 at the relatively lower cutback fluid pressure $P_{26C}$. Consequently, the fluid pressure in the upstream conduit 30 and the selected first force-transmitting mechanism 38 also immediately drops to its relatively lower cutback fluid pressure $P_{30C}$ which differs from the cutback fluid pressure $P_{26C}$ by the amount of the preselected difference (delta $P_a$) in fluid pressures. The fluid pressure control system 10 thereafter remains in this equilibrium or steady-state condition until the first and/or second selector valve means 46,58 are shifted to another mode of operation. The decrement of fluid pressure by which the peak fluid pressures are changed to their cutback fluid pressures (i.e., $P_{30P}$ minus $P_{30C}$; $P_{26P}$ minus $P_{26C}$) can be varied for different applications according to the chosen diameter $D_2$ of the second reaction slug 230.

In the unlikely event that the load piston 90 becomes stuck or is otherwise unable to move leftwardly towards its second position at the appropriate time, the ball check of the auxiliary relief valve 222 will unseat and open direct fluid communication between the modulating pressure chamber 214 and the drain chamber 218 when the fluid pressure in the modulating pressure chamber 214 exceeds the maximum limit fluid pressure $P_M$. The maximum limit fluid pressure $P_M$ is chosen to be, for example, about 69 kPa (about 10 psi) higher than the chosen fluid pressure $P_{214}$ in the modulating pressure chamber 214 when the load piston 90 is supposed to be at its second position. In the event of a malfunction as described above, the auxiliary relief valve 222 prevents the fluid pressure in the modulating pressure chamber 214 from exceeding the maximum limit fluid pressure $P_M$ and therefore protects the entire fluid pressure control system 10 from excessively high and damaging fluid pressures.

The above description of operation is applicable regardless of which first force-transmitting mechanism 38,42 is selected or which second force-transmitting mechanism 50,54 is selected.

The fluid pressure control system 10, as set forth above, provides an arrangement which controls the rate of fluid pressure increase in a selected force-transmitting mechanism, can create a difference in fluid pressures between two different selected force-transmitting mechanisms 38,42;50,54 during initial engagement, and limits the system fluid pressures to predetermined peak levels. The fluid pressure control system 10 further provides an improved arrangement which automatically reduces the fluid pressure in each selected force-transmitting mechanism and the fluid supply line 22 to minimal but adequate fluid pressure levels.

Such an arrangement increases system efficiency by conserving, for example in some earthmoving vehicles, about 20 to 25% of the horsepower normally required to continually operate the fluid pressure control system 10 at the peak fluid pressure levels. Moreover, this arrangement reduces fluid leakage during steady-state operation and improves component reliability by operating most of the time at those minimal but adequate fluid pressure levels. Furthermore, this arrangement positively ensures a proper sequence of operation by permitting the cutback in fluid pressures only after the one or more selected force-transmitting mechanisms have been fully engaged.

Other aspects, objects, and advantages of this invention can be obtained from a study of the drawings, the disclosure, and the appended claims.

I claim:

1. A fluid pressure control system comprising:
    a fluid reservoir;
    a source of pressurized fluid connected to the fluid reservoir;
    a fluid-actuated force-transmitting mechanism;
    selector valve means connected between the source and the force-transmitting mechanism for selectively directing pressurized fluid from the source to the force-transmitting mechanism;
    modulating pressure relief valve means connected between the source and the selector valve means for providing a preselected modulated increase in fluid pressure in the force-transmitting mechanism in response to the selector valve means initially directing pressurized fluid to the selected force-transmitting mechanism and for relieving the fluid pressure above a predetermined peak fluid pressure, said modulated increase in fluid pressure being completed when the modulated fluid pressure substantially stops increasing upon initially reaching the peak fluid pressure, said modulating pressure relief valve means including a valve body defining a valve body bore and a relief valve spool reciprocably disposed in the valve body bore, said relief valve spool defining a first reaction chamber arranged in continuous fluid communication with the source and having a preselected first effective surface area which determines the magnitude of the peak fluid pressure;

sensing means for directly sensing and signaling the completion of the modulated increase in fluid pressure; and pressure cutback means, immediately triggered by the sensing means signaling the completion of the modulated increase in fluid pressure, for automatically reducing the fluid pressure in the selected force-transmitting mechanism from the peak fluid pressure to a predetermined cutback fluid pressure, said pressure cutback means including a second reaction chamber defined by the relief valve spool and having a preselected second effective surface area which is larger in magnitude than the first effective surface area and determines the magnitude of the cutback fluid pressure when the second reaction chamber is pressurized with fluid, said sensing means including directing means for directing pressurized fluid to the second reaction chamber upon completion of the modulated increase in fluid pressure while the selector valve means continues to direct pressurized fluid to the selected force-transmitting mechanism.

2. The fluid pressure control system of claim 1 wherein the modulating pressure relief valve means further includes a load piston reciprocably disposed in the valve body bore and defining with the relief valve spool an expandable and contractable modulating pressure chamber therebetween, a spring disposed in the valve body bore and resiliently biasing the load piston to a first position towards the relief valve spool, and an orifice communicating the source with the modulating pressure chamber, said load piston being reciprocably movable between its first position at which the load piston concurrently blocks fluid communication between the modulating pressure chamber and the second reaction chamber and opens fluid communication between the second reaction chamber and the fluid reservoir so that the second reaction chamber is vented and a second position, initially corresponding to the completion of the modulated increase in fluid pressure, at which the load piston concurrently blocks fluid communication between the second reaction chamber and the fluid reservoir and opens fluid communication between the modulating pressure chamber and the second reaction chamber so that the second reaction chamber is pressurized with fluid.

3. The fluid pressure control system of claim 2 wherein the directing means includes a signal conduit connected between the modulating pressure chamber and the second reaction chamber wherein the signal conduit is arranged so that fluid communication between the modulating pressure chamber and the signal conduit is blocked by the load piston at its first position and further arranged so that fluid communication between the modulating pressure chamber and the signal conduit is opened by the load piston at its second position.

4. The fluid pressure control system of claim 2 wherein the modulating pressure relief valve means further includes a first reaction slug slidably disposed in the first reaction chamber of the relief valve spool and having a transverse cross-sectional area equal to the first effective surface area of the first reaction chamber and wherein the pressure cutback means further includes a second reaction slug slidably disposed in the second reaction chamber of the relief valve spool and having a transverse cross-sectional area equal to the second effective surface area of the second reaction chamber.

5. The fluid pressure control system of claim 4 wherein the second reaction slug is axially positioned between and is directly contactable with both the valve body and the first reaction slug.

6. The fluid pressure control system of claim 2 wherein the valve body further defines a drain port connected to the fluid reservoir and intersecting the valve body bore, said drain port arranged so that the load piston at its first position blocks fluid communication between the modulating pressure chamber and the drain port and further arranged so that movement of the load piston away from its first position and beyond its second position opens fluid communication between the modulating pressure chamber and the drain port.

7. The fluid pressure control system of claim 2 wherein the load piston further includes an auxiliary relief valve which is adapted to bypass the second reaction chamber and vent the modulating pressure chamber directly to the fluid reservoir only when the fluid pressure in the modulating pressure chamber exceeds a predetermined maximum limit fluid pressure which is greater than the fluid pressure in the modulating pressure chamber when the load piston is at its second position.

8. The fluid pressure control system of claim 1 wherein the preselected peak fluid pressure is of a sufficient magnitude to completely actuate the selected fluid-actuated force-transmitting mechanism for complete engagement thereof and wherein the preselected cutback fluid pressure is of a sufficient magnitude to maintain complete actuation of the selected force-transmitting mechanism while the selector valve means continues to direct pressurized fluid thereto.

9. The fluid pressure control system of claim 1 wherein the selector valve means includes a selector valve spool which is shiftable between a neutral position at which the selector valve spool concurrently blocks fluid communication between the source and the force-transmitting mechanism and opens fluid communication between the force-transmitting mechanism and the fluid reservoir so that the force-transmitting mechanism is vented and an operating position at which the selector valve spool concurrently opens fluid communication between the source and the selected force-transmitting mechanism and blocks fluid communication between the selected force-transmitting mechanism and the fluid reservoir.

10. The fluid pressure control system of claim 1 wherein the force-transmitting mechanism is a friction clutch.

11. The fluid pressure control system of claim 1 wherein the source is a positive-displacement pump.

12. A fluid pressure control system comprising:

a fluid reservoir;

a source of pressurized fluid connected to the fluid reservoir;

a fluid-actuated force-transmitting mechanism;

a fluid supply line connected to the source;

selector valve means connected between the fluid supply line and the force-transmitting mechanism for selectively directing pressurized fluid from the fluid supply line to the force-transmitting mechanism;

modulating pressure relief valve means connected to the fluid supply line between the source and the selector valve means for providing a preselected modulated increase in fluid pressure in both the fluid supply line and the force-transmitting mechanism in response to the selector valve means initially directing pressurized fluid to the selected force-transmitting mechanism and for relieving the fluid pressure above a predetermined peak fluid pressure, said modulated increase in fluid pressure being completed when the modulated fluid pressure substantially stops increasing upon initially reaching the peak fluid pressure, said modulating pressure relief valve means including a valve body defining a valve body bore and a relief valve spool reciprocably disposed in the valve body bore, said relief valve spool defining a first reaction chamber arranged in continuous fluid communication with the fluid supply line and having a preselected first effective surface area which determines the magnitude of the peak fluid pressure;

sensing means for directly sensing and signaling the completion of the modulated increase in fluid pressure; and pressure cutback means, immediately triggered by the sensing means signaling the completion of the modulated increase in fluid pressure, for automatically reducing the fluid pressure in both the selected force-transmitting mechanism and the fluid supply line from the peak fluid pressure to a predetermined cutback fluid pressure, said pressure cutback means including a second reaction chamber defined by the relief valve spool and having a preselected second effective surface area which is larger in magnitude than the first effective surface area and determines the magnitude of the cutback fluid pressure when the second reaction chamber is pressurized with fluid, said sensing means including directing means for directing pressurized fluid to the second reaction chamber immediately upon completion of the modulated increase in fluid pressure while the selector valve means continues to direct pressurized fluid to the selected force-transmitting mechanism.

13. A multiple fluid pressure control system comprising:

a fluid reservoir;

a source of pressurized fluid connected to the fluid reservoir;

a fluid supply line including a downstream conduit and an upstream conduit wherein the upstream conduit is connected between the source and the downstream conduit;

flow restricting means disposed between the upstream and downstream conduits for restricting fluid flow in the fluid supply line and thereby establishing a preselected difference in fluid pressures in the upstream and downstream conduits;

a first fluid-actuated force-transmitting mechanism connected to the upstream conduit;

first selector valve means connected to the upstream conduit for selectively directing pressurized fluid from the upstream conduit to the first force-transmitting mechanism;

a second fluid-actuated force-transmitting mechanism connected to the downstream conduit;

second selector valve means connected to the downstream conduit for selectively directing pressurized fluid from the downstream conduit to the second force-transmitting mechanism;

modulating pressure relief valve means connected to the downstream conduit between the flow restricting means and the second selector valve means for providing in combination with the flow restricting means dual preselected modulated increases in fluid pressures in the respective upstream and downstream conduits and the respective first and second force-transmitting mechanisms in response to each of the selector valve means initially directing pressurized fluid to their respective selected force-transmitting mechanisms and for relieving the fluid pressures above respective predetermined peak fluid pressures, said dual modulated increases in fluid pressures being completed when each of the modulated fluid pressures substantially stops increasing upon initially reaching its respective peak fluid pressure, said modulating pressure relief valve means including a relief valve spool defining a first reaction chamber arranged in continuous fluid communication with the downstream conduit and having a preselected first effective surface area which determines the magnitude of the peak fluid pressure in the selected second force-transmitting mechanism and the downstream conduit;

sensing means for directly sensing and signaling the completion of the dual modulated increases in fluid pressures; and pressure cutback means, immediately triggered by the sensing means signaling the completion of the dual modulated increases in fluid pressures, for automatically reducing the fluid pressures in both of the selected force-transmitting mechanisms and the conduits to respective predetermined cutback fluid pressures, said pressure cutback means including a second reaction chamber defined by the relief valve spool and having a preselected second effective surface area which is larger in magnitude than the first effective surface area and determines the magnitude of the cutback fluid pressure in the selected second force-transmitting mechanism and the downstream conduit second reaction chamber is pressurized with fluid, said sensing means including directing means for directing pressurized fluid to the second reaction chamber immediately upon completion of the dual modulated increases in fluid pressures while the first and second selector valve means continue to direct pressurized fluid to the respective selected first and second force-transmitting mechanisms.

14. The fluid pressure control system of claim 13 wherein the flow restricting means determines the relatively higher magnitude of the cutback fluid pressure in the upstream conduit and the selected first force-transmitting mechanism.

15. The multiple fluid pressure control system of claim 13 wherein the pressure cutback means automatically changes both peak fluid pressures by the same decrement of fluid pressure.

* * * * *